(12) United States Patent
Albert

(10) Patent No.: US 12,494,643 B2
(45) Date of Patent: Dec. 9, 2025

(54) METHOD FOR DETERMINING THE OPTIMAL MIX OF ENERGY FOR A HYBRID RENEWABLE ENERGY PRODUCTION SITE

(71) Applicant: GENESIS, Paris (FR)

(72) Inventor: Laurent Albert, Saint Germain sur Vienne (FR)

(73) Assignee: GENESIS, Paris (FR)

( * ) Notice: Subject to any disclaimer, the term of this patent is extended or adjusted under 35 U.S.C. 154(b) by 330 days.

(21) Appl. No.: 18/011,355

(22) PCT Filed: Jun. 23, 2021

(86) PCT No.: PCT/EP2021/067191
§ 371 (c)(1),
(2) Date: Dec. 19, 2022

(87) PCT Pub. No.: WO2022/002726
PCT Pub. Date: Jan. 6, 2022

(65) Prior Publication Data
US 2023/0231379 A1 Jul. 20, 2023

(30) Foreign Application Priority Data
Jun. 29, 2020 (EP) .................................... 20183008

(51) Int. Cl.
*H02J 3/00* (2006.01)
*H02J 3/38* (2006.01)

(52) U.S. Cl.
CPC .............. *H02J 3/004* (2020.01); *H02J 3/003* (2020.01); *H02J 3/381* (2013.01);
(Continued)

(58) Field of Classification Search
None
See application file for complete search history.

(56) References Cited

U.S. PATENT DOCUMENTS 10,133,250 B2 * 11/2018 Kohn .................... G05B 19/048
10,289,094 B2 * 5/2019 Ashdown ................ G06F 30/20
(Continued)

FOREIGN PATENT DOCUMENTS

DE    10 2011 082780    3/2013

OTHER PUBLICATIONS

The International Search Report (ISR) with Written Opinion for PCT/EP2021/067191 dated Jul. 23, 2021, pp. 1-8.
(Continued)

*Primary Examiner* — Hua Lu
(74) *Attorney, Agent, or Firm* — McDonnell Boehnen Hulbert & Berghoff LLP

(57) ABSTRACT

A method includes collecting energy resource data for the specific geographic location over a predetermined time period, calculating power curves and matrices for at least two energy technologies based on the collected energy resource data, estimating the potential of generated electric power over time of the at least two energy technologies based on the calculated power curves and matrices, the time period, and the characteristic parameters of each of the at least two energy technologies, simulating different base load and power variations based on the estimation of the potential generated electric power and different distribution of the electric power generation of the at least two energy technologies, identifying an optimal distribution of the at least two energy technologies by analyzing the base load and power variations for each simulation, and choosing the distribution of the electric power generation with the highest base load and lowest power variation.

20 Claims, 1 Drawing Sheet

(52) U.S. Cl.
CPC ....... *H02J 2203/20* (2020.01); *H02J 2300/24* (2020.01); *H02J 2300/28* (2020.01); *H02J 2300/40* (2020.01)

(56) References Cited

U.S. PATENT DOCUMENTS

| | | | | |
|---|---|---|---|---|
| 10,290,148 | B2* | 5/2019 | Ashdown | H05B 47/16 |
| 2013/0213038 | A1* | 8/2013 | Lazaris | G06Q 30/0605 |
| | | | | 60/641.1 |
| 2015/0346753 | A1* | 12/2015 | Gan | G06Q 50/06 |
| | | | | 700/295 |
| 2016/0315807 | A1* | 10/2016 | Peng | H04L 41/0816 |
| 2017/0060161 | A1* | 3/2017 | Tyler | G06Q 50/06 |
| 2017/0284720 | A1* | 10/2017 | Liu | F25B 49/027 |
| 2017/0302218 | A1* | 10/2017 | Janik | B63B 21/50 |
| 2017/0371308 | A1* | 12/2017 | Ghosh | G05B 15/02 |
| 2020/0006944 | A1* | 1/2020 | Fife | H02J 3/004 |
| 2020/0044598 | A1* | 2/2020 | Lima | H02J 7/35 |
| 2021/0242686 | A1* | 8/2021 | Petersen | H02J 3/381 |
| 2021/0296897 | A1* | 9/2021 | Cruickshank, III | H02J 3/14 |

OTHER PUBLICATIONS

Extended European Search Report for EP 20 18 3008 dated Oct. 15, 2020 pp. 1-7.

\* cited by examiner

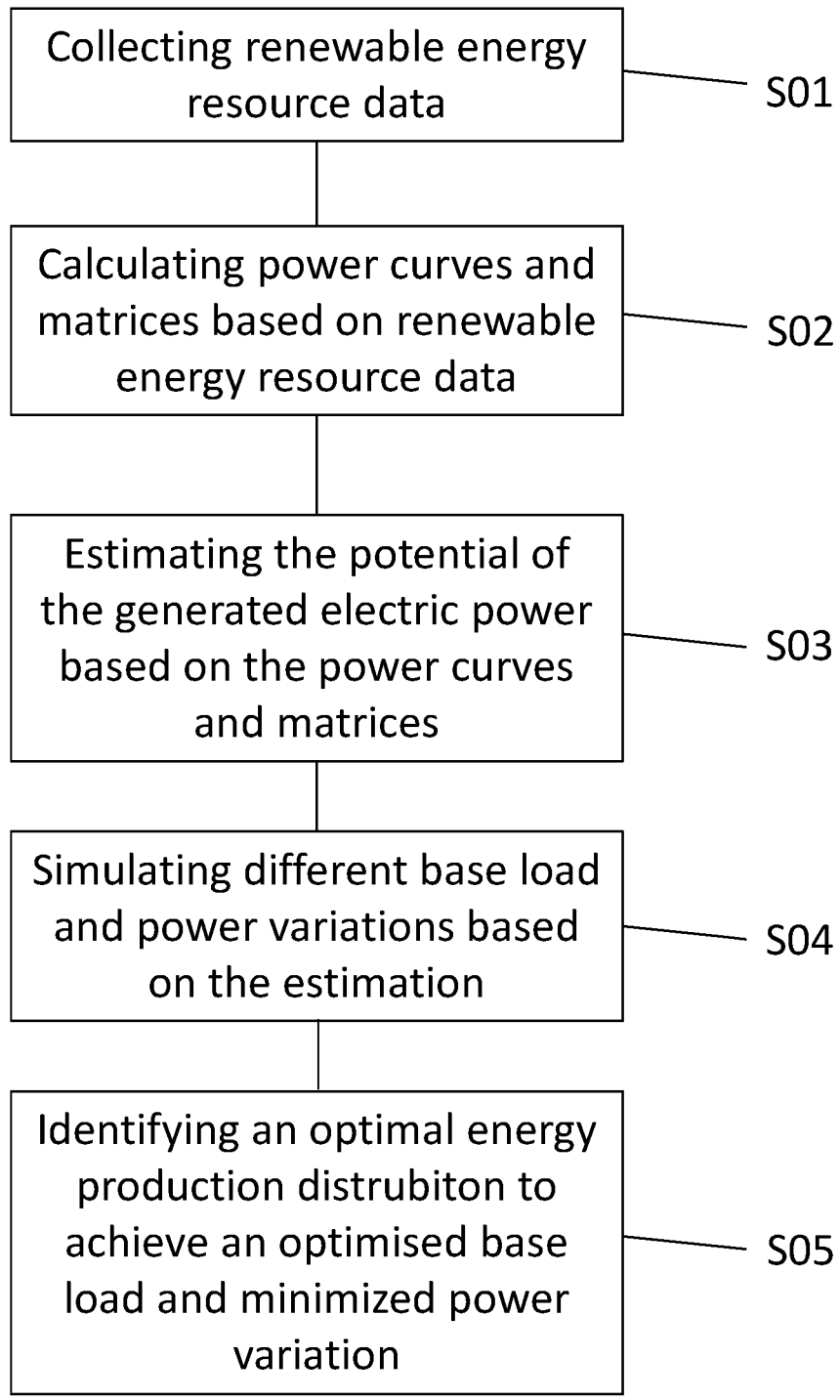

METHOD FOR DETERMINING THE OPTIMAL MIX OF ENERGY FOR A HYBRID RENEWABLE ENERGY PRODUCTION SITE

CROSS REFERENCE TO RELATED APPLICATIONS

This application is a U.S. national phase of International Application No. PCT/EP2021/067191, filed on Jun. 23, 2021, which claims priority to European Application No. 20183008.0, filed Jun. 29, 2020, both of which are incorporated by reference herein in their entirety.

FIELD OF THE DISCLOSURE

The disclosure relates to the field of renewable energy and a method for optimizing a hybrid renewable energy site in order to increase base load and long-term performance and reducing power variations. The method concerns the optimization of electric power output from energy sources such as wind, solar, waves and batteries.

BACKGROUND

In the past many renewable energy sources have been installed at various sites. Some of these renewable energy sources are wind-, wave-, solar- and hydro-electric energy production. The challenges with renewable energies are low base load, variability of generated power, predictability and therewith problems when the electric energy from such renewable energy sources is fed back into the grid. These challenges in turn can affect long term profitability and efficiency of an entire renewable energy site. One problem can for instance be that redundant power is installed that peaks and troughs at the same time so that a low base load and/or comparably high power fluctuations are present. This can be problematic since base load can be sold at better conditions than variable power. In addition, high electric power fluctuations require expensive equipment down the line, since all the components have to manage the power peaks. Such expensive equipment affects operating expenses, capital expenditure and profitability. In some cases the projected expenses of the installations, often calculated with power variation risks, may even lead to canceled projects.

These common problems such as low baseloads, high variability of power production, high costs from redundant installed power capacity and waste of produced power have in many cases in the past lead to renewable energy sites that are not profitable and, in the more severe cases, not usable as such.

In view of the above it can be said that in general, there is a lack of useful and practical tools for planning mixed or hybrid renewable energy sites. Successful case studies are rare and they vary from site to site depending on the presence of the natural resources, in the form of solar irradiation, wave climate, wind climate and other environmental factors.

Some of the proposed planning solutions are based on a limited number of studies that emphasis economic performance and spatial planning but overlook the benefits of long-term stability and optimization of power production depending on the natural resources present for each particular site. Further these calculations or simulations are often based on a combination of wind-hydro, wind-solar or solar-hydro. The existing solutions and tools for simulation and calculation are limited and provide for good spatial planning versus power output but they overlook the relevance of the long-term effect of stable power production.

In reality many communities and regions have some combination of resources that could be channeled into renewable energy. Each renewable power source they develop and install will require investment, maintenance, and technical management and each will come with its own challenges. In many cases in the past the existing renewable energy technology, thus the available technology, dictated the development plans for renewable energy. Instead the available resources, in the form of wind climate, wave climate, solar irradiation, available battery power or other available renewable energy sources such as for example geothermal heat should dictate the planning of power production sites that make use of renewable energy. The inventor has thus discovered that power production sites should be planed around available resources, since they are constant and predictable. A coastal region, for instance, will always have waves while a desert city will always have wind and solar irradiation, especially if these parameters and data is observed over a longer time period of months to years. The most sustainable power production sites should be designed around these resources.

The move to carbon free energy has to be sustainable, each decision, each investment must be towards a plan that will allow us to leave fossil fuels behind. Such a plan requires a solid foundation and long-term thinking. The resources that the environment and ecosystem of each specific geographic location are a constant factor and must be taken into consideration when designing renewable energy production sites or renewable energy power plants. Building the renewable energy world for the future starts with an optimal hybrid energy mix for the specific location where such a production site should be built.

SUMMARY

An object of the present disclosure is to provide a method that can be used for a simulation of power output and power production of a hybrid renewable energy site.

Another objection of the disclosure is to provide a method that helps to identify the most efficient and most effective combination of renewable energy sources for a renewable hybrid power production site in a specific geographic location.

The inventor of the present disclosure has realized that it is possible to drastically improve performance, electric power output and at the same time minimize power variations when planning a renewable hybrid power production site by taking into account long-term data of renewable energy resources or natural resources available for a specific location. Using this data the inventor realized that it is possible to identify the sweet spot or in other words the optimal distribution of the available renewable energy technologies, for a specific geographic location.

Disclosed herein is a method for determining the optimal renewable energy production mix for a specific geographic location via simulation, comprising the steps of:
  collecting renewable energy resource data for the specific geographic location over a predetermined time period, wherein renewable energy resource data may comprise one or more of data such as wind speed and direction, significant wave height and incoming wave direction, solar hours, solar irradiation, heat and/or pressure of geothermal wells or any other relevant renewable energy resource data;

calculating power curves and matrices for at least two renewable energy technologies based on the collected renewable energy resource data;

estimating the potential of generated electric power over time of the at least two renewable energy technologies based on the calculated power curves and matrices, the time period and the characteristic parameters of each of the at least two renewable energy technologies; and simulating different base load and power variations based on the estimation of the generated electric power and different distribution of the electric power generation of the at least two renewable energy technologies;

Identifying an optimal distribution of the at least two renewable energy technologies by analyzing the base load and power variations for each simulation and choosing the distribution of the electric power generation with the highest base load and lowest power variation.

The above described tool or method has the effect that the renewable energy resource data or natural resource data is dictating the use and in particular the distribution or mix of the renewable energy technology that is available based on the data. This is in contrast to earlier approaches and solution where the available technology dictated the planning. The data is however stronger and provides a more sustainable approach.

One reason why the above data is so important is because the wind and wave energy work perfectly well together. In combined energy parks, which comprise wind- and wave-energy, the power peaks for wind and the power peaks for wave occur not at the same time, which means that the baseload provided to the grid can be increased. In addition, the absolute peaks of the two combined renewable energy sources can be flattened. That is one of the reasons why evaluating and obtaining renewable energy resource data is of importance. It is however still to be noted that wave energy is the most constant of the two and the one that provides the higher baseload, even in coast climate, the wind energy can vary a lot while wave energy is much more constant over time, however a combination of the two renewable energy sources provides a higher baseload than any of the two renewable energy sources on its own.

A general problem with renewable energy sources, is that they have a lot of troughs and peaks with a comparably low baseload. This leads to the fact that any technology or combination that can flatten the troughs and peaks and increase the baseload is highly appreciated since it improves the quality of the energy that can be delivered to the user and because it improves the stability of the grid by reducing the occurrence of blackouts.

In an embodiment the distribution of the electric power generation is provided in a percentage number for each of the at least two renewable energy technologies and for the specific geographic location.

A costal area with an intense wind climate and tidal waves will have a distribution mix that is leaning towards wave and wind and much less solar, for example 40% wind, 40% wave and 20% solar. The percentage is thereby referring to the amount of power in Megawatt. A town close to a dessert will however more likely have a distribution that leans towards solar, wind and battery power to balance out the night, such as for example 60% solar, 40% and an additional amount of Megawatt backup power in the form of batteries, to compensate the power loss at night due to the lack of sunshine.

The renewable energy technologies may be any of wind power generation, wave power generation, solar power generation or geothermal power generation. In some cases even waste or wood fueled power plants may be considered as renewable energy sources.

The wind power generation may include windmills, the wave power generation may include tidal power plants or wave power plants, the solar power generation may be solar panels and the geothermal power generation may be heat power plants.

The described steps of the method may be taken for at least three renewable energy technologies chosen from wind power, solar power, wave power and or/geothermal power depending on the renewable energy resource data.

It is however clear that the renewable energy resource data is dictating which technology can be applied. If there is no ocean at the specific geographical location, wave power cannot be chosen. The same if there is no geothermal well available. Wind and solar may however be available as natural resource in almost any specific geographic location.

The time period may at least be several months, preferably several seasons and more preferably several years and measured in the specific geographic location.

This provides for a robust data and a good chance to achieve a long-term sustainable solution for a hybrid renewable energy production site. The more robust and reliable the data the better power generation provided by the renewable energy technologies.

As mentioned above, batteries or another energy storage medium may be used to balance the power generation such as increasing the base load and decreasing power variations.

Batteries or other energy storage medium may be used to absorb energy peaks and to provide baseload during energy troughs. If for instance solar is dominant in the mix or distribution then batteries may be used to provide an improved and therewith higher baseload at night. Alternatively, if wind and/or wave are dominant then the batteries may be used to absorb energy during storms and provide base load during calmer days.

The above described method may be performed on a computer implemented medium. The computer implemented medium or computer storage may perform the method when renewable energy resource data is fed into it.

The method may even be designed to be active on a constant basis on the computer storage medium or computer implemented medium and collect renewable energy resource data continuously and then suggest the best geographic locations for hybrid renewable energy production sites, for example four a specific region. Due to the amount of involved data, in particular natural energy resource data, the may advantageously be computer implemented so that reliable and intelligent decisions can be taken.

Terms and Definitions

Base Load

The base load is the electric power a power plant or energy production site, such as a renewable hybrid power production site, can at least provide, as measured over a 24 hours period. In some cases the time period may be longer but in any case it is basically the static minimum power output a specific power plant or power production site can provide over a pre-determined time period.

Natural Resources or Renewable Energy Resources

The natural resources or renewable energy resources are considered to be wind, wave, solar irradiation, in some battery power for balancing out the base load, geothermal heat, hydro-power or any other available natural resource in a specific region or geographic location. Wind herewith includes wind climate, such as wind direction, wind speed and wave includes wave climate, such as significant wave height and wave direction, for a coastal- or shore area. It may further include data on solar irradiation, temperature of geothermal heat wells or heat sources and even flow speed and volume of rivers and the like.

Hybrid Renewable Energy Production Site

A hybrid renewable energy production site is to be understood as an energy- or power production site that comprises a mix, preferably an optimal mix, of technologies for generating electric power out of natural renewable energy resources. A hybrid renewable energy production site may thus comprise of 25% wind-turbines, 25% wave-generators and 50% solar. The percentage values are thereby relating to the generated power in kwh, megawatt hours or megawatts. In addition, such a hybrid renewable energy production site may further comprise battery units for balancing out the generated electric power. The battery units are however not considered to be part of the actual energy producing units, since the only store energy but do not produce it as such.

Renewable Energy Technologies

The term renewable energy technologies may refer to windmills, wind turbines, wave energy converters, solar panels, steam or heat power generators (geothermal heat), hydro-electric technologies, and so on.

BRIEF DESCRIPTION OF THE FIGURES

The present disclosure will now be described, for exemplary purposes, in more detail by way of an embodiment and with reference to the enclosed drawing, in which:

FIG. 1 schematically illustrates a method according to the present disclosure.

DETAILED DESCRIPTION

The method will herewith be explained by referring to FIG. 1. An additional example is given below with the case of Bermuda and a reference to Ireland.

FIG. 1 illustrates the method according to the present disclosure comprising the various steps for simulating an optimal distribution of generated power by renewable energy technologies based on renewable energy resource data.

The method for determining the optimal renewable energy production mix for a specific geographic location via simulation, comprises the steps of:

Collecting S01 renewable energy resource data for the specific geographic location over a predetermined time period;

Calculating S02 power curves and matrices for at least two renewable energy technologies based on the collected renewable energy resource data;

Estimating S03 the potential of generated electric power over time of the at least two renewable energy technologies based on the calculated power curves and matrices, the time period and the characteristic parameters of each of the at least two renewable energy technologies; and Simulating S04 different base load and power variations based on the estimation of the potential generated electric power and different distribution of the electric power generation of the at least two renewable energy technologies;

Identifying S05 an optimal distribution of the at least two renewable energy technologies by analyzing the base load and power variations for each simulation and choosing the distribution of the electric power generation with the highest base load and lowest power variation.

The simulating step S04 comprises different energy distribution scenarios calculated based on the collection S01, the calculation S02 and the estimation with the aim to find the distribution that provides for the highest base load over time and the lowest power variations over time. Over time means at least for the time period as looking backwards. Thus, the time period in the past, thus several months, several seasons or several years, during which the natural resource data was collected is used to gain a look or prediction into the future for an estimation of base load and power variation with the aim to find the optimal hybrid energy mix.

The natural resource data or renewable energy resource data may have a resolution of 0.5 hours (30 minutes), 1 hour, 2 hours or 3 hours. If a production site or a specific geographic location has to be analyzed as of today, the resolution may be even lower and monitored continuously for instance.

Example 1—Bermuda/Ireland

The island of Bermuda is 21 miles long and two miles wide at its widest point. No one on Bermuda lives thus far away from the ocean, which is probably one of the reasons the island receives nearly 700,000 visitors a year. It has ample sunshine, wind, and waves, but there are competing interests. The inhabitants of Bermuda use the roofs of their houses for rainwater catchment rather than solar panels. There is no space for large wind farms nor solar farms on the island(s), and any energy source offshore must be sufficiently invisible that it doesn't affect the tourist's holiday views.

The island has a need of more than 510,000 MWh of electricity and, like most islands, currently depends on highly polluting and extremely expensive imported fossil fuels. Per capita residents of Bermuda pay about five times what residents of the United States pay for electricity. Because of their rooftop water catchment systems, they can only derive about 6% of their power from photovoltaic solar panels.

Given these parameters, and using daily sun, wind, and wave data from several months on Bermuda, it was calculated how to generate optimal electric power from the renewable energy sources wind and wave, since solar was not an option, the 6% of solar could not be further increased due to non-available land. By plotting the power output of each resource on a graph, and cross-referencing it against another graph that plots variability of power produced by wind and wave, we concluded that the most reliable base load and thus the highest base load of power for Bermuda would be found by supplementing the solar power with 28% wind energy and 66% wave energy. This would provide the highest possible base load based on the three renewable energy sources wind, wave and the installed solar.

The above calculations and simulations were done for Bermuda alone and based on Bermuda's geography, land mass, and access to a powerful wave climate. For a different location the numbers will most likely be different.

Ireland, for example, has wood, water, wind, wave and some wastes as key renewable energy sources. Its wave climate is dynamic, up to three meters waves on the west coast and one to two meters on the Irish Sea. There are only about 1400 hours of sunlight per year—averaging to less than four hours a day. On average there are less than two days with wind gales each year at some inland places like Carlow, but more than fifty days a year at northern coastal locations such as Malin Head.

When choosing how to design a renewable energy program that would bring the most reliable renewable power to the country's grid, tracking each available resource's output over time, and plotting it, would provide each Irish area's hybrid optimal mix of energy and the smartest strategy for providing stable electric power from renewable energy resources. This would also lead to optimized long-term investments and improved use of renewable energy technologies.

Example 2—Planning of a Renewable Energy Production Site

A developer wants to find out how to best plan a hybrid renewable energy farm using solar, offshore wind and wave power in the Canary Islands. The developer aims at a total of 100 MW of installed capacity. Now the developer has to decide what the best distribution (quotas) of installed capacities between the three renewable energy resources is so that the baseload is maximized, and the power intermittency or variation is the lowest.

The developer can make use of the following:

The renewable energy resource data comprises mean wind speed, significant wave height, energy period and solar irradiance for a time period of one year. The data sets have a temporal resolution of 1 h (hourly data).

For the example the developer selects the following renewable energy conversion technologies: Wind turbine: Siemens SG 8.0; Wave energy converter: Seabased WEC M100, Solar panel system: Siemens PV 1000. From these conversion technologies the performance curves and matrices are extracted.

Then the power produced for each conversion technology is estimated using the renewable energy resource data and the given parameters of the specific devices.

Then different scenarios (pre-conceded or idealized) and therewith simulations are performed and the total produced power per energy conversion technology array is calculated. This corresponds to the total aggregated electric energy production in the time domain.

The next step is then to estimate the combined baseloads in the mixture of the simulation and to then calculate the temporal variability (variance) of power production in function of the allocated quotas/distribution of installed capacity of solar-wind and wave.

Finally the different scenarios and simulations are used to find the quotas or distribution that delivers for the highest baseload and the lowest variance in power.

The proposal for the installation could for instance be:
100% installed capacity=100 MW;
in which 25% solar (25 MW)
in which 35% wind (35 MW)
and 40% wave (40 MW);

This mix then provides a baseload of 50 MWh with a variance of 20% at the designated and specific geographic location.

The disclosure has now been described according to FIG. 1 and two examples. The features of any of the two examples may however by interchangeable so are the features referred to in connection with FIG. 1. The features or steps are not isolated and can be applied interchangeably to various scenarios and simulations. The shown methods and examples are not limiting to the scope of the disclosure and provide the reader with a better foundation for understanding the present disclosure.

The invention claimed is:

1. A method for determining the optimal renewable energy production mix for a specific geographic location via simulation, comprising the steps of:
   Collecting renewable energy resource data for the specific geographic location over a predetermined time period, wherein the renewable energy resource data comprises data such as wind speed and direction, significant wave height and incoming wave direction, solar hours, solar irradiation, heat and/or pressure of geothermal wells or any other relevant renewable energy resource data;
   Calculating power curves and matrices for at least two renewable energy technologies based on the collected renewable energy resource data;
   Estimating the potential of generated electric power over time of the at least two renewable energy technologies based on the calculated power curves and matrices, the time period and the characteristic parameters of each of the at least two renewable energy technologies;
   Simulating different base load and power variations based on the estimation of the potential generated electric power and different distribution of the electric power generation of the at least two renewable energy technologies; and
   Identifying an optimal distribution of the at least two renewable energy technologies by analysing the base load and power variations for each simulation and choosing the distribution of the electric power generation with the highest base load and lowest power variation.

2. The method according to claim 1, wherein the distribution of the electric power generation is provided in a percentage number for each of the at least two renewable energy technologies and for the specific geographic location.

3. The method according to claim 1, wherein the renewable energy technologies is any of wind power generation, wave power generation, solar power generation or geothermal power generation.

4. The method according to claim 1, wherein the above steps are taken for at least three renewable energy technologies chosen from wind power, solar power, wave power and or/geothermal power and depending on the renewable energy resource data.

5. The method according to claim 1, wherein the time period is at least several months, preferably several seasons and more preferably several years and measured in the specific geographic location.

6. The method according to claim 1, wherein batteries or another energy storage medium is used to balance the power generation such as increasing the base load and decreasing power variations.

7. A memory or a computer executable medium that is configured to perform the method according to claim 1.

8. A method comprising the steps of:
   Collecting renewable energy resource data for a geographic location over a time period, wherein the renewable energy resource data comprises wind speed and direction, wave height and incoming wave direction, solar hours, solar irradiation, heat of geothermal wells, and pressure of the geothermal wells;

Calculating power curves and matrices for at least two renewable energy technologies based on the renewable energy resource data;

Estimating a potential of generated electric power over time of the at least two renewable energy technologies based on the power curves and the matrices, the time period and characteristic parameters of each of the at least two renewable energy technologies;

Performing simulations of base load and power variations based on the potential of the generated electric power and different distributions of electric power generation of the at least two renewable energy technologies; and Identifying a distribution of the at least two renewable energy technologies by analysing the base load and the power variations for each of the simulations and choosing the distribution of the electric power generation with a highest base load and a lowest power variation.

9. The method according to claim 8, wherein the distribution of the electric power generation is provided in a percentage number for each of the at least two renewable energy technologies and for the geographic location.

10. The method according to claim 8, wherein the renewable energy technologies is any of wind power generation, wave power generation, solar power generation or geothermal power generation.

11. The method according to claim 8, wherein the calculating, estimating, and performing steps are performed for at least three renewable energy technologies chosen from wind power, solar power, wave power and or/geothermal power and depending on the renewable energy resource data.

12. The method according to claim 8, wherein the time period is at least several months, and measured in the geographic location.

13. The method according to claim 8, wherein batteries or another energy storage medium is used to balance the power generation such as increasing the base load and decreasing power variations.

14. A memory or a computer executable medium that is configured to perform the method according to claim 8.

15. A method for determining the optimal renewable energy production mix for a specific geographic location via simulation, comprising the steps of:

Collecting renewable energy resource data for the specific geographic location over a predetermined time period, wherein the renewable energy resource data comprises wind speed and direction, wave height and incoming wave direction, solar hours, solar irradiation, heat of geothermal wells, and pressure of the geothermal wells;

Calculating power curves and matrices for at least two renewable energy technologies based on the collected renewable energy resource data;

Estimating the potential of generated electric power over time of the at least two renewable energy technologies based on the calculated power curves and matrices, the time period and the characteristic parameters of each of the at least two renewable energy technologies;

Simulating different base load and power variations based on the estimation of the potential generated electric power and different distribution of the electric power generation of the at least two renewable energy technologies; and Identifying an optimal distribution of the at least two renewable energy technologies by analysing the base load and power variations for each simulation and choosing the distribution of the electric power generation with the highest base load and lowest power variation.

16. The method according to claim 15, wherein the distribution of the electric power generation is provided in a percentage number for each of the at least two renewable energy technologies and for the specific geographic location.

17. The method according to claim 15, wherein the renewable energy technologies is any of wind power generation, wave power generation, solar power generation or geothermal power generation.

18. The method according to claim 15, wherein the above steps are taken for at least three renewable energy technologies chosen from wind power, solar power, wave power and or/geothermal power and depending on the renewable energy resource data.

19. The method according to claim 15, wherein batteries or another energy storage medium is used to balance the power generation such as increasing the base load and decreasing power variations.

20. A memory or a computer executable medium that is configured to perform the method according to claim 15.

* * * * *